(12) United States Patent
Kawamura (10) Patent No.: US 12,398,683 B2
(45) Date of Patent: Aug. 26, 2025

(54) INJECTION CONTROL APPARATUS (71) Applicant: Honda Motor Co., Ltd., Tokyo (JP)

(72) Inventor: Taijiro Kawamura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/823,917

(22) Filed: Sep. 4, 2024

(65) Prior Publication Data
US 2025/0084804 A1    Mar. 13, 2025

(51) Int. Cl.
*F02D 41/40* (2006.01)
*F02D 41/30* (2006.01)

(52) U.S. Cl.
CPC ....... *F02D 41/402* (2013.01); *F02D 41/3094* (2013.01); *F02D 2200/021* (2013.01)

(58) Field of Classification Search
CPC ................ F02D 41/402; F02D 41/401; F02D 2041/389; F02D 41/38; F02D 41/40; F02D 41/3094; F02D 41/30; F02D 41/3058; F02D 45/00
USPC .......................... 123/295, 305, 456, 478, 491
See application file for complete search history.

(56) References Cited

FOREIGN PATENT DOCUMENTS

| CN | 114720139 A | * | 7/2022 | ............ G01M 15/02 |
| FR | 2974855 A1 | * | 11/2012 | ........... F02D 41/405 |
| JP | 2011106350 A | | 6/2011 | |
| JP | 6815960 B2 | * | 1/2021 | |

* cited by examiner

*Primary Examiner* — Lindsay M Low
*Assistant Examiner* — Teuta B Holbrook
(74) *Attorney, Agent, or Firm* — Duft & Bornsen, PC (57) ABSTRACT

Injection control apparatus includes: injector, drive circuit including battery, booster circuit, and current supply circuit, and controller configured to perform: setting target number of injections and target injection timing per combustion cycle based on operating condition of engine; determining whether first interval from valve opening timing of first injection to valve opening timing of second injection is first threshold value or longer and whether second interval from valve opening timing of second injection to valve opening timing of third injection is second threshold value or longer based on target number of injections and target injection timing, first, second, and third injections being three consecutive injections in one single combustion cycle or two consecutive combustion cycles; and reducing target number of injections when it is determined that first interval is shorter than first threshold value and second interval is shorter than second threshold value.

8 Claims, 7 Drawing Sheets

INJECTION CONTROL APPARATUS

CROSS-REFERENCE TO RELATED APPLICATION

This application is based upon and claims the benefit of priority from Japanese Patent Application No. 2023-146904 filed on Sep. 11, 2023, the content of which is incorporated herein by reference.

BACKGROUND OF THE INVENTION

Field of the Invention

The present invention relates to an injection control apparatus configured to control fuel injection of a direct injection internal combustion engine that performs multi-stage injection.

Description of the Related Art

In these years, in order to ensure for all people to have access to affordable, reliable, sustainable, and advanced energy, research and development have been conducted on multi-stage injection of an internal combustion engine for contributing to energy efficiency. As this type of technology, a device that adjusts the number of injections and the injection interval of the multi-stage injection has been conventionally known. For example, in the device described in JP2011-106350 A, the number of injections is set to be capable of ensuring the charging time of a boost capacitor in a high-voltage generation circuit that generates a high voltage to be applied to an electromagnetic solenoid of a fuel injection valve, and in addition, injection at a time later than an injectable time limit is prohibited.

However, in a case where the number of injections is set to be capable of ensuring the charging time of the boost capacitor as in the device described in JP2011-106350 A, the number of injections of the multi-stage injection is limited, and thereby the effect of the multi-stage injection may be impaired.

SUMMARY OF THE INVENTION

An aspect of the present invention is an injection control apparatus, including: an injector configured to inject fuel into a combustion chamber of an internal combustion engine; a drive circuit including a battery, a booster circuit configured to boost electric power from the battery, and an electric current supply circuit configured to supply drive current to the injector by using the electric power boosted by the booster circuit; and a controller configured to control the drive circuit. The controller includes a processor and a memory coupled to the processor, and is configured to perform: setting a target number of injections and a target injection timing per combustion cycle of the internal combustion engine based on an operating condition of the internal combustion engine; determining whether a first interval from a valve opening timing of a first injection to a valve opening timing of a second injection is equal to or longer than a first threshold value and whether a second interval from the valve opening timing of the second injection to a valve opening timing of a third injection is equal to or longer than a second threshold value based on the target number of injections and the target injection timing, the first injection, the second injection, and the third injection being three consecutive injections in one single combustion cycle or two consecutive combustion cycles; and reducing the target number of injections when it is determined that the first interval is shorter than the first threshold value and the second interval is shorter than the second threshold value.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 12. An injection control apparatus according to an embodiment of the present invention is applied to a direct injection internal combustion engine that performs multi-stage injection. Hereinafter, in particular, an example in which the injection control apparatus is applied to a direct injection gasoline engine mounted on a vehicle will be described.

Figure 1:
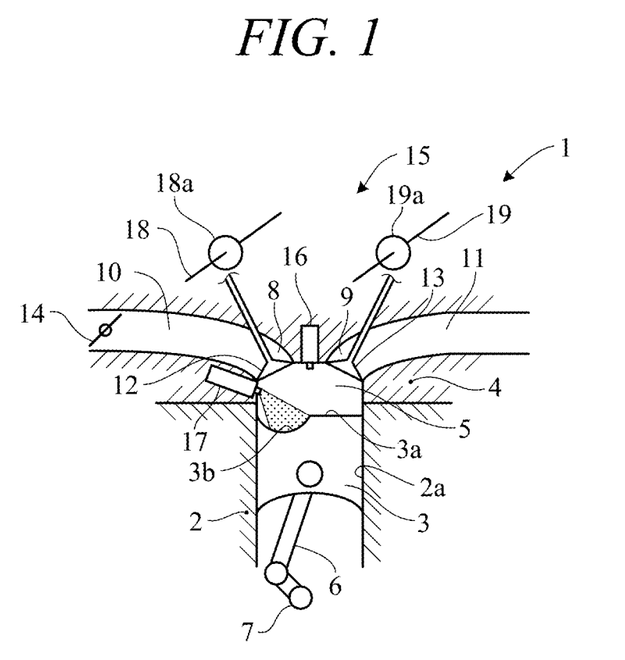
FIG. 1 is a diagram schematically illustrating a configuration of a substantial part of an engine, to which an injection control apparatus according to an embodiment of the present invention is applied.

FIG. 1 is a diagram schematically illustrating a configuration of a substantial part of an engine 1, to which an injection control apparatus according to an embodiment of the present invention is applied. The engine 1 is a spark ignition internal combustion engine, and is a four-stroke engine that undergoes four strokes of an intake stroke, a compression stroke, an expansion stroke, and an exhaust stroke during one combustion cycle. The engine 1 includes a plurality of cylinders such as four cylinders, but FIG. 1 illustrates a configuration of a single cylinder. Note that the configurations of the respective cylinders are identical to each other.

As illustrated in FIG. 1, the engine 1 includes: a cylinder 2a, which is formed in a cylinder block 2; a piston 3, which is slidably disposed inside the cylinder 2a; and a combustion chamber 5, which is formed between a crown surface (piston crown surface) 3a of the piston 3 and a cylinder head 4. On the piston crown surface 3a, for example, a recess portion 3b is formed along a tumble flow in the cylinder. The piston 3 is coupled with a crankshaft 7 through a connecting rod 6, and the crankshaft 7 rotates, as the piston 3 reciprocates along an inner wall of the cylinder 2a.

The cylinder head 4 is provided with an intake port 8 and an exhaust port 9. The combustion chamber 5 communicates with an intake passage 10 through the intake port 8, and communicates with the exhaust passage 11 through the exhaust port 9. The intake port 8 is opened and closed by an intake valve 12, and the exhaust port 9 is opened and closed by an exhaust valve 13. A throttle valve 14 is provided in the intake passage 10 on an upstream side of the intake valve 12. The throttle valve 14 includes, for example, a butterfly valve, and an intake air amount into the combustion chamber 5 is adjusted by the throttle valve 14. The intake valve 12 and the exhaust valve 13 are driven to open and close by a valve mechanism 15.

An ignition plug 16 and a direct injection injector 17 are attached to the cylinder head 4 so as to face the combustion chamber 5. The ignition plug 16 is disposed between the intake port 8 and the exhaust port 9, generates sparks by electric energy, and ignites an air-fuel mixture in the combustion chamber 5.

The injector 17 is disposed in the vicinity of the intake valve 12, and is driven by electric energy to inject the fuel. More specifically, the injector 17 is supplied with high-pressure fuel from a fuel tank through a fuel pump. The injector 17 highly atomizes the fuel, and injects the fuel obliquely downward into the combustion chamber 5 at a predetermined timing. Note that the arrangement of the injector 17 is not limited to this, and for example, the injector 17 can be disposed in the vicinity of the ignition plug 16.

The valve mechanism 15 includes an intake cam shaft 18 and an exhaust cam shaft 19. The intake cam shaft 18 integrally includes an intake cam 18a, which corresponds to each cylinder (cylinder 2a). The exhaust cam shaft 19 integrally includes an exhaust cam 19a, which corresponds to each cylinder. The intake cam shaft 18 and the exhaust cam shaft 19 are coupled with the crankshaft 7 via a timing belt, not illustrated, and respectively rotate once whenever the crankshaft 7 rotates twice.

The intake valve 12 is opened and closed by the rotation of the intake cam shaft 18 at a predetermined timing in accordance with the profile of the intake cam 18a via an intake rocker arm, not illustrated. The exhaust valve 13 is opened and closed by the rotation of the exhaust cam shaft 19 at a predetermined timing in accordance with the profile of the exhaust cam 19a via an exhaust rocker arm, not illustrated.

Figure 2:
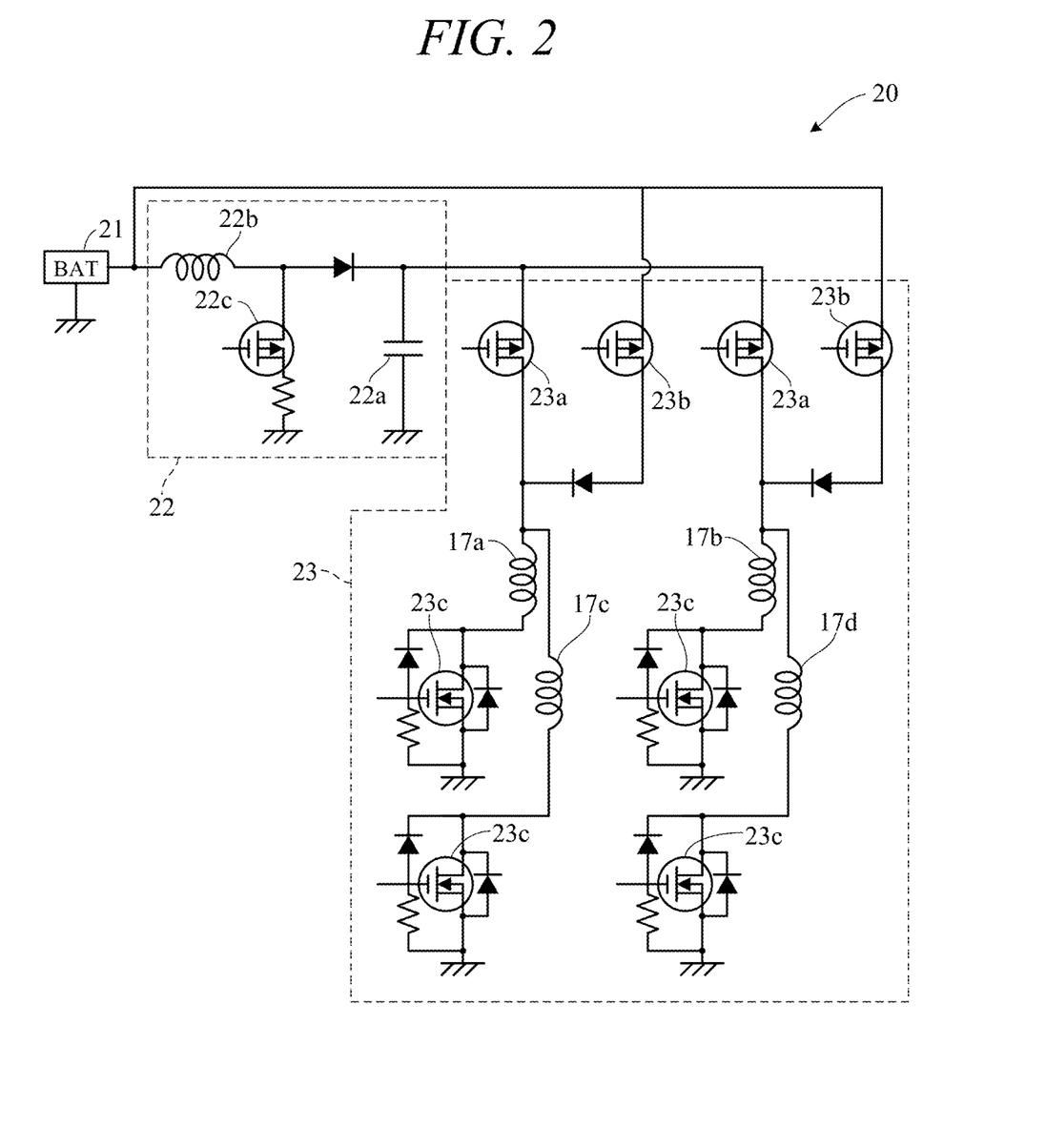
FIG. 2 is a diagram schematically illustrating a configuration of a substantial part of a drive circuit that drives an injector in FIG. 1.

FIG. 2 is a diagram schematically illustrating a configuration of a substantial part of a drive circuit 20, which drives the injector 17. FIG. 2 illustrates an example in which the engine 1 is an in-line four-cylinder engine. In this engine 1, ignition is conducted whenever the crank angle increases by 180 degrees in the order of a first cylinder #1, a third cylinder #3, a fourth cylinder #4, and a second cylinder #2. In the following description, it is assumed that an injector 17a injects the fuel into a combustion chamber 5a of the first cylinder #1, an injector 17b injects the fuel into a combustion chamber 5b of the third cylinder #3, an injector 17c injects the fuel into a combustion chamber 5c of the fourth cylinder #4, and an injector 17d injects the fuel into a combustion chamber 5d of the second cylinder #2.

As illustrated in FIG. 2, the drive circuit 20 includes: one single booster circuit 22, which boosts electric power (voltage) from an in-vehicle battery 21; and an electric current supply circuit 23, which supplies drive current to the injectors 17a to 17d with use of the electric power that has been boosted by the booster circuit 22. The booster circuit 22 includes one single capacitor 22a. In this manner, the single booster circuit 22 including the single capacitor 22a is commonly used by the four injectors 17a to 17d, so that the number of component parts can be reduced, the cost can be suppressed, and the configuration can be simplified.

In addition to the capacitor 22a, the booster circuit 22 includes a booster coil 22b, an FET 22c as a switching element, a diode as a rectifier element, a resistor, and the like. One end of the booster coil 22b is connected with the in-vehicle battery 21, and the other end of the booster coil 22b is connected with the drain of the FET 22c, and is also connected with the capacitor 22a through a diode. The source of the FET 22c is connected with a resistor.

When a switching signal is input into the gate of the FET 22c and the FET 22c is turned on, a battery voltage is applied to the booster coil 22b, and electric energy is stored. When a switching signal is input into the gate of the FET 22c and the FET 22c is turned off, the electric energy stored in the booster coil 22b is supplied to and stored in the capacitor 22a. By repeatedly turning on and off the FET 22c, the battery voltage is boosted up to a predetermined boosted voltage corresponding to the electrostatic capacity of the capacitor 22a.

The electric current supply circuit 23 includes FETs 23a, 23b, and 23c as switching elements, diodes as rectifier elements, resistors, and the like. The source of the FET 23a is connected with an output side of the booster circuit 22, and the drain of the FET 23a is connected with one end of a solenoid actuator of each of the injectors 17a to 17d. The source of the FET 23b is directly connected with the in-vehicle battery 21, and the drain of the FET 23b is connected with one end of the solenoid actuator of each of the injectors 17a to 17d through a diode. The drain of the FET 23c is connected with the other end of the solenoid actuator of each of the injectors 17a to 17d. A diode is interposed between the gate and the drain of the FET 23c, and a resistor is interposed between the gate and the source of the FET 23c.

When the injectors 17a to 17d are opened from a valve closed state, a switching signal is input into the gates of the FET 23a and the FET 23c, which respectively correspond to the injectors 17a to 17d, and the FET 23a and the FET 23c are turned on. Thus, the capacitor 22a of the booster circuit 22 is discharged, the boosted voltage is applied to the solenoid actuator of each of the injectors 17a to 17d, and each of the injectors 17a to 17d is opened from the valve closed state.

After each of the injectors 17a to 17d is opened, in a case of maintaining a valve open state, a switching signal is input into the gates of the FET 23a and the FET 23b, which respectively correspond to the injectors 17a to 17d, the FET 23a is turned off, and in addition, the FET 23b is turned on. In this manner, instead of the boosted voltage from the booster circuit 22, the battery voltage from the in-vehicle battery 21 is applied to the solenoid actuator of each of the injectors 17a to 17d, and the valve open state of each of the injectors 17a to 17d is maintained.

When the injectors 17a to 17d are closed from the valve open state, a switching signal is input into the gates of the FET 23*b* and the FET 23*c*, which respectively correspond to the injectors 17*a* to 17*d*, and the FET 23*b* and the FET 23*c* are turned off. Thus, the supply of the drive current to the solenoid actuator of each of the injectors 17*a* to 17*d* is stopped, and each of the injectors 17*a* to 17*d* is closed from the valve open state.

Figure 3:
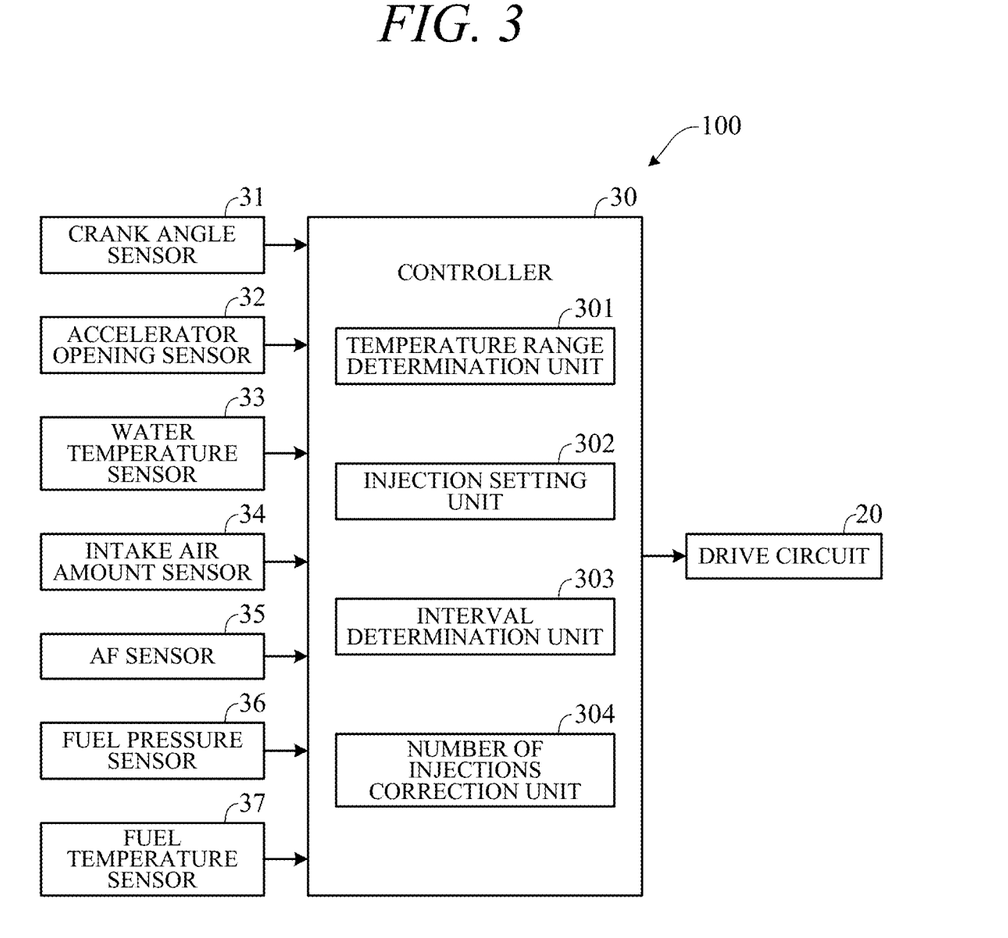
FIG. 3 is a block diagram illustrating a configuration of a substantial part of the injection control apparatus according to the embodiment of the present invention.

FIG. 3 is a block diagram illustrating a configuration of a substantial part of an injection control apparatus (hereinafter, the apparatus) 100 according to an embodiment of the present invention. As illustrated in FIG. 3, the apparatus 100 is configured with a controller 30 as its center. The controller 30 is connected with a crank angle sensor 31, an accelerator opening sensor 32, a water temperature sensor 33, an intake air amount sensor 34, an AF sensor 35, a fuel pressure sensor 36, a fuel temperature sensor 37, and the drive circuit 20.

The crank angle sensor 31 is provided on the crankshaft 7 (FIG. 1), and is configured to output a pulse signal in accordance with the rotation of the crankshaft 7. The controller 30 identifies the rotation angle (crank angle) of the crankshaft 7 with reference to the position of the top dead center TDC at the start timing of the intake stroke of the piston 3, based on a pulse signal from the crank angle sensor 31, and also calculates the engine speed.

The accelerator opening sensor 32 is provided on an accelerator pedal of a vehicle on which the engine 1 is mounted, and detects an operation amount (accelerator opening) on the accelerator pedal. The target torque of the engine 1 is commanded in accordance with a detection value of the accelerator opening sensor 32. The water temperature sensor 33 is provided on a passage through which engine cooling water for cooling the engine 1 flows, and detects a temperature of the engine cooling water (cooling water temperature). The intake air amount sensor 34 is a sensor that detects an intake air amount, and includes, for example, an airflow meter disposed on the intake passage 10 (more specifically, on an upstream side of the throttle valve 14). The AF sensor 35 is provided on the exhaust passage 11, and detects an air-fuel ratio of the exhaust gas in the exhaust passage 11.

The fuel pressure sensor 36 is a sensor that detects pressure of high-pressure fuel supplied to the injector 17 via a fuel pump, and is provided, for example, on fuel piping. The fuel temperature sensor 37 is a sensor that detects a temperature of the fuel supplied to the injector 17, and is provided, for example, on fuel piping.

The controller 30 performs predetermined processing, based on signals from the sensors 31 to 37, and outputs a switching signal to the FETs 22*c* and 23*a* to 23*c* to control the drive circuit 20. More specifically, the drive circuit 20 is controlled such that after the injector 17*a* injects the fuel into the combustion chamber 5*a*, the injector 17*b* injects the fuel into the combustion chamber 5*b*; after the injector 17*b* injects the fuel into the combustion chamber 5*b*, the injector 17*c* injects the fuel into the combustion chamber 5*c*; after the injector 17*c* injects the fuel into the combustion chamber 5*c*, the injector 17*d* injects the fuel into the combustion chamber 5*d*; and after the injector 17*d* injects the fuel into the combustion chamber 5*d*, the injector 17*a* injects the fuel into the combustion chamber 5*a*.

The controller 30 includes an electronic control unit (ECU), and is configured with a computer including a processor such as a CPU, a memory such as a ROM and a RAM, and other peripheral circuits. The controller 30 includes, as functional configurations, a temperature range determination unit 301, an injection setting unit 302, an interval determination unit 303, and a number of injections correction unit 304, and functions as the temperature range determination unit 301, the injection setting unit 302, the interval determination unit 303, and the number of injections correction unit 304.

The temperature range determination unit 301 determines whether the engine 1 is in a low in-cylinder temperature state in which a temperature $T_p$ of the piston crown surface 3*a* (FIG. 1) is lower than a predetermined temperature $T_{p0}$ (for example, 100° C.) or in a high in-cylinder temperature state in which the temperature $T_p$ is equal to or higher than the predetermined temperature $T_{p0}$, based on a workload of the engine 1. In the case of a gasoline engine, the output (work rate) of the engine 1 has a correlation with an intake air amount G, and the workload (total workload) of the engine 1 has a correlation with an integrated amount $\Sigma G$ of the intake air amount G. The cylinder 2*a* and the piston 3, which constitute the combustion chamber 5, have heat capacities corresponding to the respective materials and masses. Hence, a certain amount of heat corresponding to the respective heat capacities, that is, a certain amount of workload is necessary to increase the temperatures of these constituent members.

Figure 4:
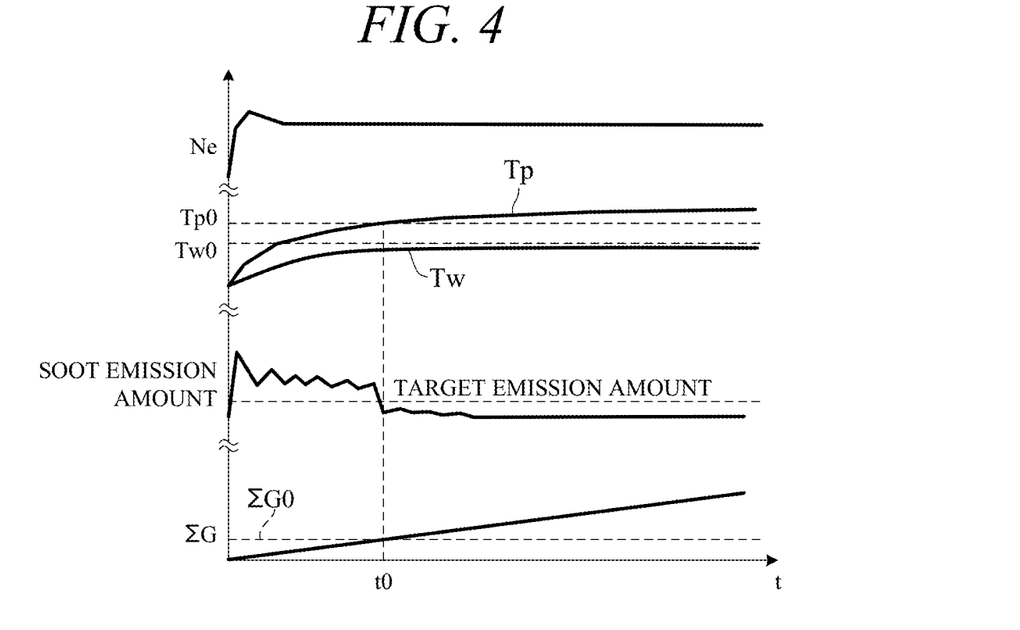
FIG. 4 is a diagram for describing temperature increase of a piston crown surface in FIG. 1.

FIG. 4 is a diagram for describing the temperature increase of the piston crown surface 3*a*, and illustrates an example of a temporal change in soot emission amount to be measured with use of a measuring instrument when the engine 1 is warmed up from a cold state. The temperature $T_p$ of the piston crown surface 3*a* indicated in FIG. 4 is an estimated value, and a cooling water temperature $T_w$ is a detection value of the water temperature sensor 33. In addition, the integrated amount $\Sigma G$ of the intake air amount G is a calculated value that has been calculated, based on the intake air amount G, which has been detected by the intake air amount sensor 34.

As indicated in FIG. 4, in the cold state of the engine 1, the temperature of the entire engine 1 including the piston crown surface 3*a* and the engine cooling water is uniform, and the cold state of the engine 1 is detectable by the water temperature sensor 33, as the cooling water temperature $T_w$ at the time of starting up the engine 1. While the engine 1 is being warmed up, the integrated amount $\Sigma G$ of the intake air amount G (heat amount and workload generated by combustion) increases, and the temperature $T_p$ of the piston crown surface 3*a* increases. The temperature $T_p$ of the piston crown surface 3*a* increases, then the entire engine 1 including the piston crown surface 3*a* is gradually warmed up from the combustion chamber 5 side, and the cooling water temperature $T_w$ increases. The engine 1 is warmed up, then the engine cooling water passes through a radiator, not illustrated, to maintain the cooling water temperature $T_w$ at equal to or lower than a predetermined temperature $T_{w0}$ (for example, 90° C.), and the engine 1 is cooled by the engine cooling water.

As indicated in FIG. 4, the soot emission amount is substantially constant until time t0, and rapidly decreases to become lower than a target emission amount at time t0. This point will be described. As illustrated in FIG. 1, the fuel injected from the injector 17 adheres to the piston crown surface 3*a* (recess portion 3*b*). In this situation, in a case where the temperature $T_p$ of the piston crown surface 3*a* reaches the predetermined temperature $T_{p0}$ (for example, 100° C.), the attached fuel is immediately evaporated, and soot is hardly generated. On the other hand, in a case where the temperature $T_p$ of the piston crown surface 3*a* does not reach the predetermined temperature $T_{p0}$, the adhered fuel is incompletely burned, and soot is easily generated.

By performing a confirmation test of the soot emission amount as illustrated in FIG. 4, it becomes possible to grasp beforehand an integrated amount (threshold) ΣG0 of the intake air amount G to be necessitated by the time the temperature Tp of the piston crown surface 3a reaches the predetermined temperature Tp0 from the cooling water temperature Tw at the time of starting up the engine 1. The temperature range determination unit 301 determines that the engine 1 is in the low in-cylinder temperature state, in a case where the integrated amount ΣG of the intake air amount G is smaller than the threshold ΣG0, and determines that the engine 1 is in the high in-cylinder temperature state, in a case where the integrated amount ΣG of the intake air amount G is equal to or larger than the threshold ΣG0. This eliminates the need for directly detecting the temperature Tp of the piston crown surface 3a, which reciprocates in the cylinder 2a while facing the high-temperature combustion chamber 5, with use of a sensor, and enables determination of whether the temperature Tp of the piston crown surface 3a has reached the predetermined temperature Tp0.

Note that the threshold ΣG0 as indicated in FIG. 4 varies depending on the cold state of the engine 1, that is, depending on the cooling water temperature Tw at the time of starting up. That is, the threshold ΣG0 of the integrated amount ΣG of the intake air amount G to be necessitated by the time the engine 1 reaches the high in-cylinder temperature state increases, as the cooling water temperature Tw at the time of starting up the engine 1 decreases, and decreases, as the cooling water temperature Tw at the time of starting up the engine 1 increases. The characteristic of the threshold ΣG0 with respect to the cooling water temperature Tw at the time of starting up the engine 1 is stored in a memory beforehand.

The injection setting unit 302 in FIG. 3 sets a target number of injections and a target injection timing per combustion cycle of the engine 1, based on a predetermined characteristic in accordance with an operating condition of the engine 1.

Adhesion Reduction Mode

In a case where the temperature range determination unit 301 determines that the engine 1 is in the low in-cylinder temperature state, the injection setting unit 302 sets the target number of injections and the target injection timing so as to suppress the adhesion of the fuel to the piston crown surface 3a, the inner wall surface of the cylinder 2a, or the like (adhesion reduction mode). In an adhesion reduction mode, the fuel is injected to generate an air-fuel mixture in a region other than a predetermined injection prohibition region in the vicinity of the intake top dead center TDC at a start timing of the intake stroke and the compression top dead center TDC at an end timing of the compression stroke, that is, in a region where the piston crown surface 3a is apart from the injector 17 (injectable region). In this situation, by injecting the fuel in multi-stage injection, the fuel injection amount per injection is suppressed. As a result, adhesion of the fuel to the piston crown surface 3a or the wall surface of the cylinder 2a can be suppressed, and generation of soot can be suppressed. The injection prohibition region is set to, for example, a partial region or a substantially entire region of an early half of the intake stroke and a partial region or a substantially entire region of a latter half of the compression stroke.

More specifically, the injection inhibition region is set in accordance with the engine rotation speed. As the engine rotation speed is higher, the speed at which the piston crown surface 3a recedes from the injector 17 in the intake stroke and the speed at which the piston crown surface 3a approaches the injector 17 in the compression stroke are higher. Therefore, as the engine rotation speed increases, the injection prohibition region in the intake stroke becomes narrower (the end of the injection prohibition region moves to an advance angle side), and the injection prohibition region in the compression stroke becomes wider (the start of the injection prohibition region moves to the advance angle side).

Figure 5:
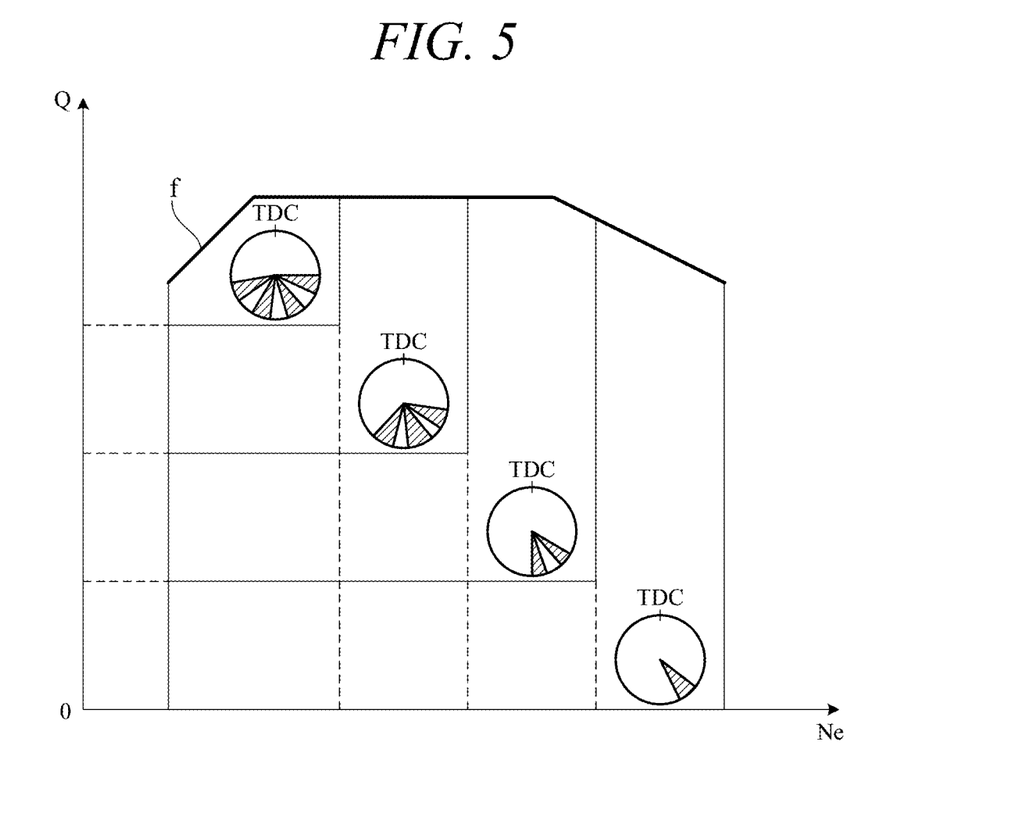
FIG. 5 is a diagram illustrating an example of an injection identification map corresponding to an adhesion reduction mode.

The target number of injections and the target injection timing in the injectable region are determined by an injection identification map stored beforehand in a memory, for example, a characteristic map illustrated in FIG. 5. That is, as illustrated in FIG. 5, they are determined by a predetermined characteristic map in association with a characteristic f of maximum output torque in accordance with an engine speed Ne and a target injection amount Q. In a case where the number of injections is a plurality of times, the injection amounts per injection are equal to each other. Note that the target injection amount Q is calculated as a value at which an actual air-fuel ratio becomes a target air-fuel ratio, and is determined in accordance with the intake air amount G. Therefore, the injection characteristic map of FIG. 5 can be rewritten into a map of the engine speed Ne and the intake air amount G.

Note that in FIG. 5, the crank angle in a section from the start of the intake stroke (intake top dead center TDC) to the end of the compression stroke (compression top dead center TDC) is indicated by an angle of a clockwise circle that starts from the intake top dead center TDC, and the timing of the fuel injection is also indicated by fan-shaped hatching that extends radially from the center of the circle. In the intake stroke, the crank angle is in a range from equal to or larger than 0 degrees to equal to or smaller than 180 degrees, and in the compression stroke, the crank angle is in a range equal to or larger than 180 degrees to equal to or smaller than 360 degrees. A range where the crank angle is equal to or larger than 0 degrees and equal to or smaller than 90 degrees will be referred to as an early half of the intake stroke, and a range where the crank angle is equal to or larger than 90 degrees and equal to or smaller than 180 degrees will be referred to as a latter half of the intake stroke. A range where the crank angle is equal to or larger than 180 degrees and equal to or smaller than 270 degrees will be referred to as an early half of the compression stroke, and a range where the crank angle is equal to or larger than 270 degrees and equal to or smaller than 360 degrees will be referred to as a latter half of the compression stroke.

In order to suppress adhesion of the fuel to the piston crown surface 3a, it is preferable to increase the number of injections so as to reduce the injection amount per injection. However, a minimum injection amount Qmin per injection of the injector 17 is defined in accordance with the specifications of the injector 17, and the injector 17 is not capable of injecting an amount smaller than the minimum injection amount Qmin (minimum injection time restriction). Therefore, the target number of injections is set to be smaller, as the target injection amount Q is smaller.

In addition, a minimum pause time from closing of the injector 17 to opening of the injector 17 is defined in accordance with the specifications of the injector 17 (minimum pause time restriction). The minimum pause time is set such that a change in the injection amount (flow rate) due to a residual magnetic influence on the solenoid actuator in each of the injectors 17a to 17d (FIG. 2) falls within an allowable range.

On the other hand, in order to increase the number of injections, it is necessary to drive the injector 17 at a high speed, and it is necessary to repeat charging and discharging of the capacitor 22a in the drive circuit 20 (FIG. 2) in a short time. In this case, it is necessary to increase the driving speed of the injector 17, as the engine speed Ne increases. The electric load of the controller 30, which outputs a switching signal to the FET 22c of the drive circuit 20, increases, and the calorific value of the controller 30 increases. As a result, the number of injections is limited by the thermal restriction of the controller 30 (maximum number of injections restriction). Therefore, the target number of injections is set to be smaller, as the engine speed Ne is higher.

Knock Suppression Mode

In a case where the temperature range determination unit 301 determines that the engine 1 is in the high in-cylinder temperature state and a predetermined knock suppression condition is satisfied, the injection setting unit 302 sets the target number of injections and the target injection timing to suppress an occurrence of knocking (knock suppression mode). The knock suppression condition is satisfied when a retard amount of the ignition timing, to be necessary for suppressing an occurrence of knocking at a low rotation and a high load, with respect to the optimum ignition timing is equal to or larger than a predetermined value.

In the knock suppression mode, the retarded ignition timing is returned to the optimum ignition timing side, and the fuel is injected once in the intake stroke (for example, the early half of the intake stroke) and once in the compression stroke (for example, the early half of the compression stroke) (two-stage injection in the intake stroke and the compression stroke). In this case, the injection amount in the compression stroke is the minimum injection amount Qmin, and an amount obtained by subtracting the minimum injection amount Qmin from the target injection amount Q is injected in the intake stroke. By injecting the fuel in the compression stroke, an end gas temperature of the combustion chamber 5 is decreased by latent heat of vaporization. This enables suppression of an occurrence of knocking, while suppressing the retard amount of the ignition timing. Therefore, the combustion efficiency can be enhanced, as compared with a case where the fuel is injected only in the intake stroke with the retarded ignition timing.

Figure 6:
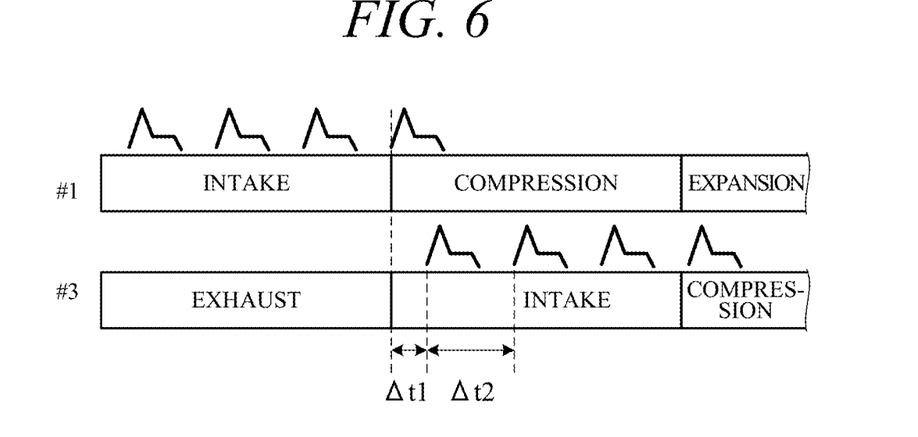
FIG. 6 is a diagram for describing an injection interval in the adhesion reduction mode.

FIG. 6 is a diagram for describing an injection interval Δt in the adhesion reduction mode, and illustrates an injection interval Δt, when the injector 17a injects the fuel into the combustion chamber 5a of the first cylinder #1 and subsequently the injector 17b injects the fuel into the combustion chamber 5b of the third cylinder #3. The injection interval Δt denotes a period of time between two consecutive injections in a single combustion cycle or two consecutive combustion cycles, and denotes a period of time from the valve opening timing of a previous injection (target injection timing) to the valve opening timing of a next injection.

As illustrated in FIG. 6, in the adhesion reduction mode in which the multi-stage injection is performed, an injection interval Δt1 from the final (the fourth time in the illustrated example) injection of the first cylinder #1 (in the illustrated example, injection in the compression stroke) to the first injection of the third cylinder #3 (in the illustrated example, injection in the intake stroke) is shorter than an injection interval Δt2 from the first injection to the second injection of the third cylinder #3, in some cases. That is, in the adhesion reduction mode, the injection intervals in a single combustion cycle in the identical cylinder are equal to each other. However, the injection interval from the final injection of a previous combustion cycle to the first injection of a next combustion cycle in two consecutive combustion cycles between the cylinders is shorter than the injection interval in the identical cylinder, in some cases.

Figure 7:
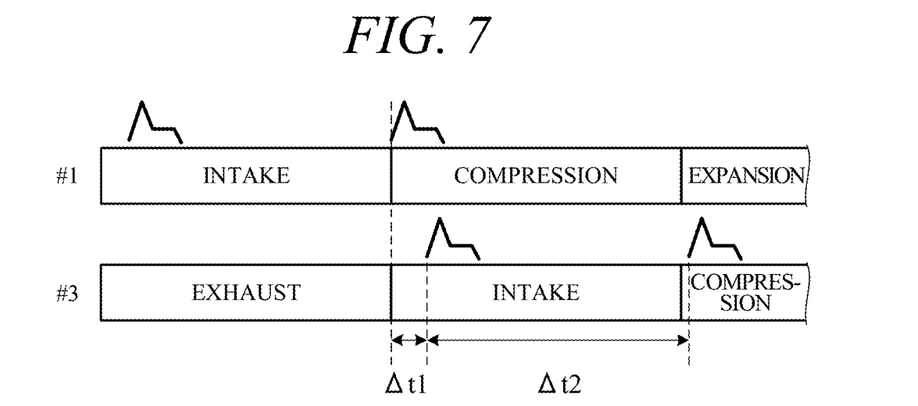
FIG. 7 is a diagram for describing an injection interval in a knock suppression mode.

FIG. 7 is a diagram for describing the injection interval Δt in the knock suppression mode. As illustrated in FIG. 7, also in the knock suppression mode in which the injection is performed in the intake stroke and the compression stroke, the injection interval Δt1 from the final injection of the first cylinder #1 (for example, the early half of the compression stroke) to the first injection of the third cylinder #3 (for example, the early half of the intake stroke) is shorter than the injection interval Δt2 from the first injection to the second injection of the third cylinder #3, in some cases. That is, also in the knock suppression mode, in the two consecutive combustion cycles between the cylinders, the injection interval from the final injection of the previous combustion cycle to the first injection of the next combustion cycle is shorter than the injection interval in the identical cylinder, in some cases.

Figure 8:
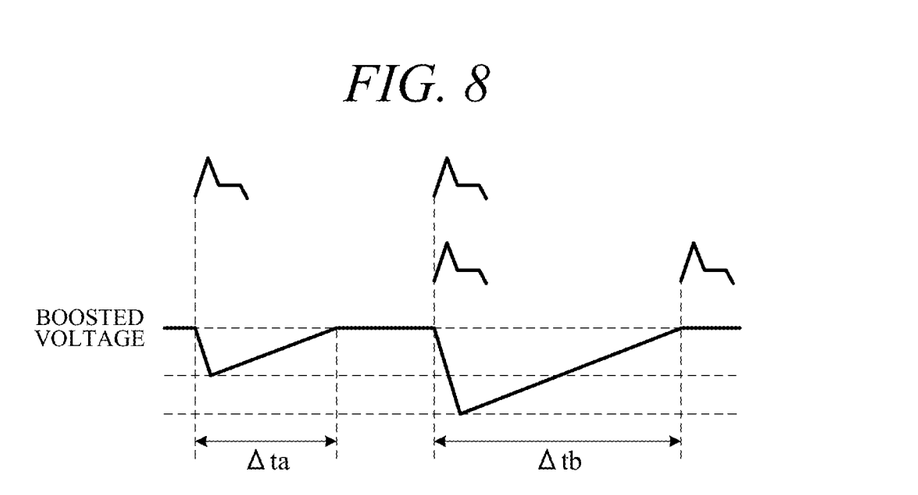
FIG. 8 is a diagram for describing a boost recovery time of a capacitor in FIG. 1.

FIG. 8 is a diagram for describing a boost recovery time of the capacitor 22a (FIG. 2). As illustrated in FIG. 8, after the capacitor 22a is discharged, a predetermined boost recovery time is necessary until the boosted state in which the voltage has been boosted up to the boosted voltage is recovered. More specifically, a predetermined first recovery time Δta is needed from the time when the valve of one injector 17 (solenoid actuator) is opened (discharged) in the boosted state to the time when the boosted state is recovered. The first recovery time Δta is defined in accordance with the specifications of the injector 17 and the drive circuit 20. After previous discharge is performed, the next discharge is performed in a state in which the boosted state is not recovered, and until the boosted state is recovered, a predetermined second recovery time Δtb, which is longer than the first recovery time Δta, is necessary. The second recovery time Δtb is the longest in a case where the previous discharge and the next discharge are performed simultaneously. In this case, the second recovery time Δtb is about twice the first recovery time Δta.

When the injection interval Δt1 is shorter as illustrated in FIGS. 6 and 7, the injection interval Δt1 is shorter than the first recovery time Δta, in particular, at a high rotation and a high load, and the capacitor 22a is insufficiently charged. Thus, the valve opening of the injector 17 is delayed or insufficient, in some cases. In such cases, if the number of injections is reduced so that all the injection intervals Δt become equal to or longer than the first recovery time Δta, the effects including a reduction of adhesion of the fuel to the piston crown surface 3a, the inner wall surface of the cylinder 2a, or the like due to multi-stage injection and knock suppression may be impaired. Hence, in the present embodiment, the apparatus 100 is configured as follows so that a limitation to the number of injections of the multi-stage injection can be suppressed.

Figure 9:
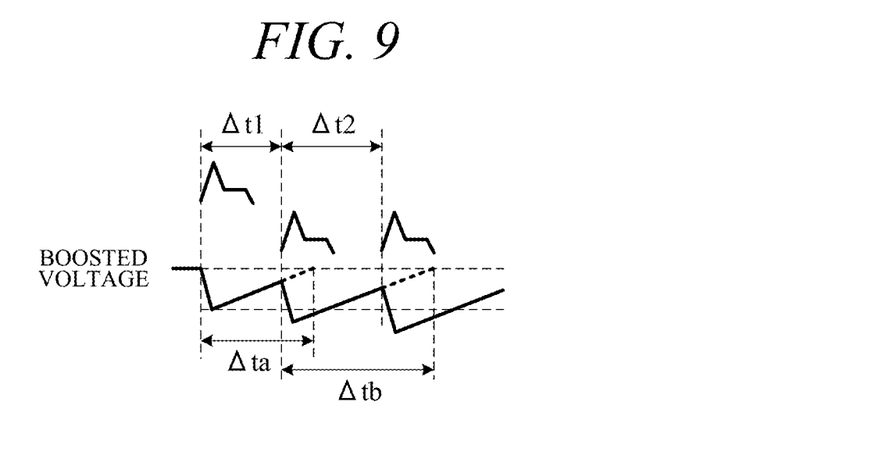
FIG. 9 is a diagram for describing a case where a boosted state of the capacitor is not recovered.

FIG. 9 is a diagram for describing a case where the boosted state of the capacitor 22a is not recovered, and illustrates the injection intervals Δt of the first injection, second injection, and third injection that are consecutively performed by the injector 17 and the charged state of the capacitor 22a. As illustrated in FIG. 9, when the injection interval Δt1 from the first injection to the second injection is shorter than the first recovery time Δta and the injection interval Δt2 from the second injection to the third injection is shorter than the second recovery time Δtb, a voltage drop of the capacitor 22a accumulates. Such accumulation of the voltage drop of the capacitor 22a leads to a significant decrease in the injection amount (a flow rate) of the injector 17, and thus is not allowable. Therefore, it is necessary to reduce the number of injections per combustion cycle to ensure an appropriate injection amount by the injector 17. In this case, for example, it is necessary to reduce the number of injections by prohibiting the final injection in each combustion cycle and to review the injection amount per injection so as to ensure the target injection amount Q.

Figure 10:
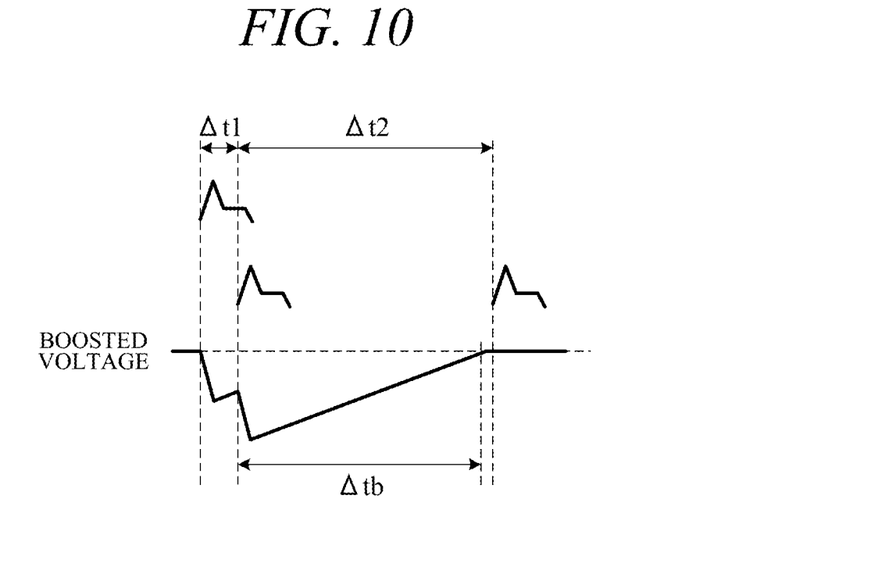
FIG. 10 is a diagram for describing a case where the boosted state of the capacitor is recovered.

FIG. 10 is a diagram for describing a case where the boosted state of the capacitor 22a is recovered. As illustrated in FIG. 10, even in a case where the injection interval Δt1 from the first injection to the second injection is shorter than the first recovery time Δta, when the injection interval Δt2 from the second injection to the third injection is equal to or longer than the second recovery time Δtb, the voltage drop of the capacitor 22a does not accumulate, and the boosted state is recovered. In such a temporary voltage drop of the capacitor 22a, a decrease in the injection amount by the injector 17 is limited. Thus, even though the number of injections is maintained, there is a possibility that a decrease in combustion performance and emission performance due to the decrease in the injection amount falls within an allowable range. For example, in a case where the previous discharge and the next discharge are performed simultaneously, it is possible to determine, in a test beforehand, an operating condition under which the decrease in combustion performance and emission performance due to the decrease in the injection amount falls within an allowable range.

Figure 11:
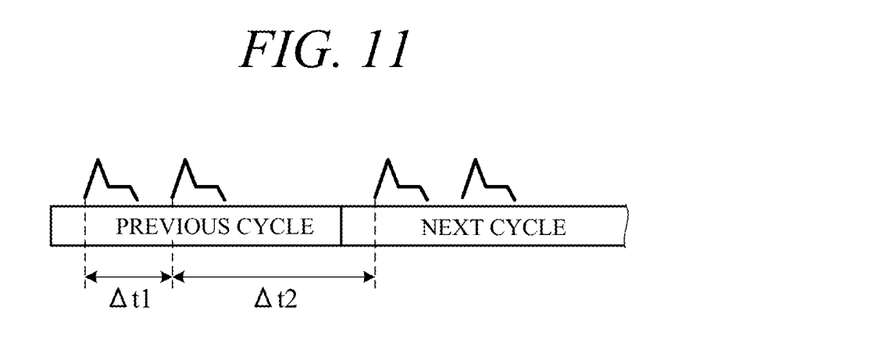
FIG. 11 is a diagram for describing a modification of first injection, second injection, and third injection.

FIG. 11 is a diagram for describing a modification of the first injection, the second injection, and the third injection, and illustrates an injection interval Δt when the two-stage injection is performed. As illustrated in FIG. 11, the first injection and the second (final) injection in the previous combustion cycle of two consecutive combustion cycles may be set to the first injection and the second injection, and first injection in the next combustion cycle may be set to the third injection. In this case, the previous combustion cycle and the next combustion cycle may be two consecutive combustion cycles in the identical cylinder, or may be two consecutive combustion cycles between different cylinders.

The interval determination unit 303 in FIG. 3 determines whether the injection interval Δt1 from the first injection to the second injection is equal to or longer than the first recovery time Δta, based on the target number of injections and the target injection timing that have been set by the injection setting unit 302. Then, when it is determined that the injection interval Δt1 is shorter than the first recovery time Δta, it is further determined whether the injection interval Δt2 from the second injection to the third injection is equal to or longer than the second recovery time Δtb. The second recovery time Δtb may be predetermined as, for example, a value about two times the first recovery time Δta, or may be calculated in accordance with the injection interval Δt1 from the first injection to the second injection.

When the interval determination unit 303 determines that the injection interval Δt2 from the second injection to the third injection is shorter than the second recovery time Δtb, the number of injections correction unit 304 corrects the number of injections per combustion cycle to be smaller than the target number of injections (in other words, reduces the target number of injections as set by the injection setting unit 302 based on the predetermined characteristic in accordance with the operating condition of the engine 1). That is, even though the injection interval Δt1 from the first injection to the second injection is shorter than the first recovery time Δta, when the injection interval Δt2 from the second injection to the third injection is equal to or longer than the second recovery time Δtb, the target number of injections is maintained. This suppresses a limitation to the number of injections of the multi-stage injection, so that the emission performance and the combustion performance can be improved even with a relatively high rotation and a relatively high load.

The controller 30 calculates the target injection amount Q per combustion cycle in accordance with the intake air amount that has been detected by the intake air amount sensor 34, while conducting feedback control so that the actual air-fuel ratio that has been detected by the AF sensor 35 becomes the target air-fuel ratio (for example, a theoretical air-fuel ratio). Then, a target injection amount (unit target injection amount) per injection of the injector 17 is calculated in accordance with the target number of injections that has been set by the injection setting unit 302. More specifically, in the adhesion reduction mode, a value obtained by dividing the target injection amount Q by the target number of injections is calculated as the unit target injection amount, and in the knock suppression mode, an amount obtained by subtracting the minimum injection amount Qmin from the minimum injection amount Qmin (compression stroke) and the target injection amount Q is calculated as the target injection amount. The controller 30 controls the drive circuit 20 so that the injector 17 injects the fuel of the unit target injection amount at the target injection timing in accordance with the crank angle θ, which has been detected by the crank angle sensor 31. That is, by outputting a switching signal to the FETs 22c and 23a to 23c of the drive circuit 20, the controller 30 controls the drive circuit 20.

Figure 12:
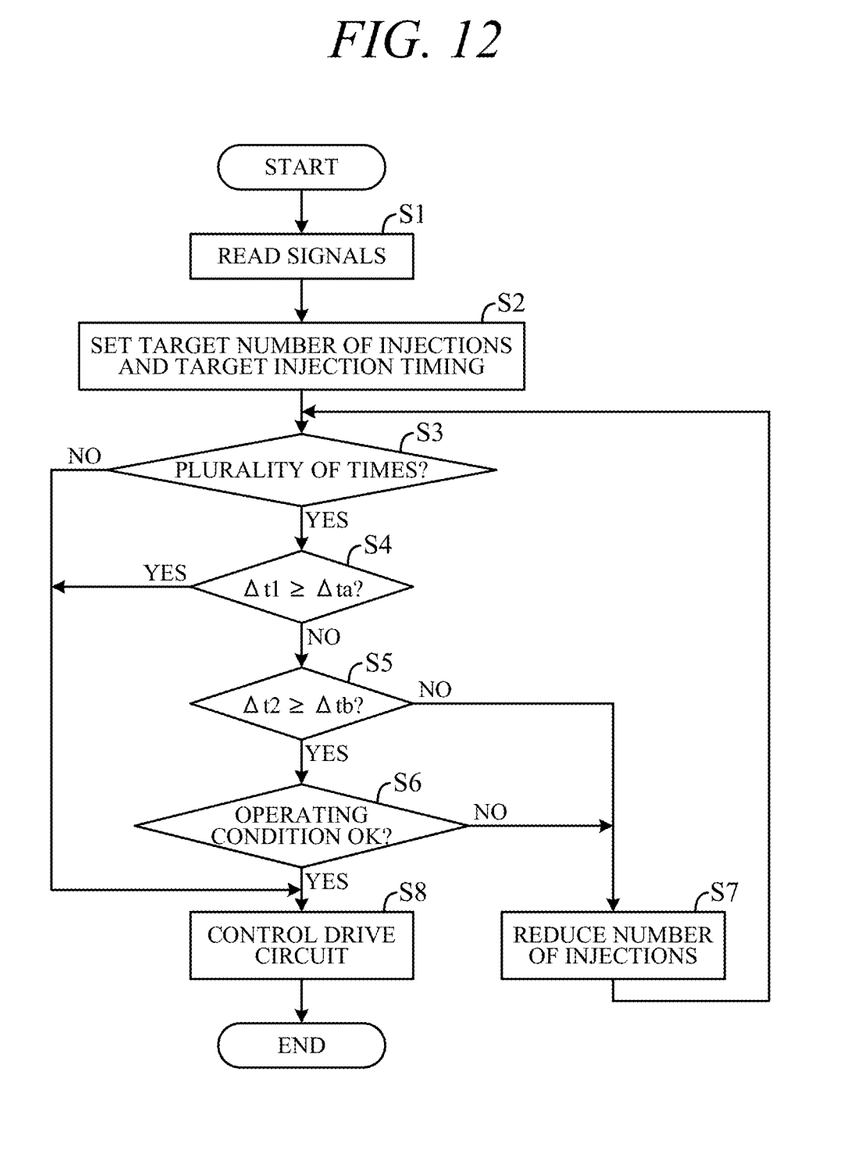
FIG. 12 is a flowchart illustrating an example of processing by the injection control apparatus according to the embodiment of the present invention.

FIG. 12 is a flowchart illustrating an example of processing by the apparatus 100, and illustrates an example of processing performed by the controller 30 in accordance with a program stored in a memory beforehand. The processing illustrated in this flowchart is started, for example, when the engine 1 starts operating, and is repeated at a predetermined cycle.

As illustrated in FIG. 12, first, in step S1, signals from the sensors 31 to 37 are read. Next, in step S2, the target number of injections per combustion cycle and the target injection timing from the injector 17 are set, based on the signals read in step S1. Next, in step S3, it is determined whether the target number of injections set in step S2 is a plurality of times, that is, whether the injection is multi-stage injection. In a case where an affirmative determination is made in step S3, the processing proceeds to step S4, and in a case where a negative determination is made, the processing proceeds to step S8.

In step S4, it is determined whether the injection interval Δt1 from the first injection to the second injection is equal to or longer than the first recovery time Δta, based on the target number of injections and the target injection timing set in step S2. In a case where a negative determination is made in step S4, the processing proceeds to step S5, and in a case where an affirmative determination is made, the processing proceeds to step S8. In step S5, it is determined whether the injection interval Δt2 from the second injection to the third injection is equal to or longer than the second recovery time Δtb, based on the target number of injections and the target injection timing set in step S2. In a case where an affirmative determination is made in step S5, the processing proceeds to step S6, and in a case where a negative determination is made, the processing proceeds to step S7.

In step S6, it is determined, based on the signals read in step S1, whether the current operating condition of the engine 1 is an operating condition in which a decrease in the combustion performance and the emission performance due to the decrease in the injection amount falls within an allowable range. In a case where an affirmative determination is made in step S6, the processing proceeds to step S8, and in a case where a negative determination is made, the processing proceeds to step S7. In step S7, the number of injections is reduced by one, and the processing returns to step S3. In step S8, the target injection amount and the unit target injection amount are calculated, based on the signals read in step S1 and the number of injections set and corrected (reduced) in steps S2 to S7, and a switching signal is output to the FETs 22c and 23a to 23c of the drive circuit 20 so that the injector 17 injects the fuel of the unit target injection amount at the target injection timing.

According to the present embodiment, the operations and effects are achievable as follows.

(1) The apparatus 100 includes: the injector 17 configured to inject fuel into the combustion chamber 5 of the engine 1; the drive circuit 20 including the in-vehicle battery 21, the booster circuit 22 configured to boost electric power from the in-vehicle battery 21, and the electric current supply circuit 23 configured to supply drive current to the injector 17, by using the electric power boosted by the booster circuit 22; and the controller 30 configured to control the drive circuit 20 (FIGS. 1 to 3).

The controller 30 includes: the injection setting unit 302 configured to set a target number of injections and a target injection timing per combustion cycle of the engine 1, based on an operating condition of the engine 1; the interval determination unit 303 configured to determine whether an injection interval Δt1 from a valve opening timing of first injection to a valve opening timing of second injection is equal to or longer than a first recovery time Δta and configured to determine whether an injection interval Δt2 from the valve opening timing of the second injection to a valve opening timing of third injection is equal to or longer than a second recovery time Δtb based on the target number of injections and the target injection timing that have been set by the injection setting unit 302, in a case where either the number of injections in a single combustion cycle or a total number of injections in two consecutive combustion cycles is at least three times and the three consecutive injections are defined as the first injection, the second injection, and the third injection; and the number of injections correction unit 304 configured to correct the number of injections per combustion cycle to be smaller than the target number of injections that has been set by the injection setting unit 302 (or configured to reduce the target number of injections as set by the injection setting unit 302), in a case where the interval determination unit 303 determines that the first interval Δt1 is shorter than the first recovery time Δta and the injection interval Δt2 is shorter than the second recovery time Δtb (FIG. 3 and FIG. 12).

That is, even though the injection interval Δt1 from the first injection to the second injection is shorter than the first recovery time Δta, when the injection interval Δt2 from the second injection to the third injection is equal to or longer than the second recovery time Δtb, the target number of injections is maintained (FIG. 10). This suppresses a limitation to the number of injections of the multi-stage injection, so that the emission performance and the combustion performance can be improved even with a relatively high rotation and a relatively high load.

(2) The combustion chamber 5 includes the combustion chambers 5a and 5b, and the injector 17 includes the injectors 17a and 17b configured to respectively inject the fuel into the combustion chambers 5a and 5b (FIG. 2). The electric current supply circuit 23 supplies the drive current to each of the injectors 17a and 17b, and the controller 30 controls the drive circuit 20 so that after the injector 17a injects the fuel into the combustion chamber 5a, the injector 17b injects the fuel into the combustion chamber 5b. The first injection denotes a final injection of the combustion cycle by the injector 17a, the second injection denotes a first injection of the combustion cycle by the injector 17b, and the third injection denotes a second injection of the combustion cycle by the injector 17b (FIGS. 6 to 10).

That is, when multi-stage injection is performed by a multi-cylinder engine, in particular, at a high rotation and a high load, the injection interval from the final injection of the previous combustion cycle to the first injection of the next combustion cycle in the two consecutive combustion cycles between the cylinders is decreased, and is shorter than a predetermined boost recovery time, in some cases. Also in such cases, when the injection interval from the first injection to the second injection in the next combustion cycle is sufficiently long, the number of injections is maintained, so that the emission performance and the combustion performance can be improved even with a relatively high rotation and a relatively high load.

(3) The controller 30 further includes the temperature range determination unit 301 configured to determine whether the engine 1 is in a low in-cylinder temperature state in which the temperature Tp of the piston crown surface 3a is lower than the predetermined temperature Tp0 or in a high in-cylinder temperature state in which the temperature Tp is equal to or higher than the predetermined temperature Tp0 (FIG. 3). In a case where the temperature range determination unit 301 determines that the engine 1 is in the low in-cylinder temperature state, the injection setting unit 302 sets the target number of injections and the target injection timing to inject the fuel a plurality of times from the intake stroke to the compression stroke of the combustion cycle (FIG. 6). That is, in the adhesion reduction mode, multi-stage injection is performed to suppress adhesion of the fuel to the piston crown surface 3a, the inner wall surface of the cylinder 2a, and the like, so that generation of soot is suppressed and the emission performance is improved.

(4) The controller 30 further includes the temperature range determination unit 301 configured to determine whether the engine 1 is in a low in-cylinder temperature state in which the temperature Tp of the piston crown surface 3a is lower than the predetermined temperature Tp0 or in a high in-cylinder temperature state in which the temperature Tp is equal to or higher than the predetermined temperature Tp0 (FIG. 3). In a case where the temperature range determination unit 301 determines that the engine 1 is in the high in-cylinder temperature state, the injection setting unit 302 sets the target number of injections and the target injection timing to inject the fuel once in each the intake stroke and the compression stroke of the combustion cycle, when a predetermined knock suppression condition is satisfied (FIG. 7). That is, in the knock suppression mode, two-stage injection in the intake stroke and the compression stroke is performed to reduce an end gas temperature of the combustion chamber 5 with use of the latent heat of vaporization of the fuel that has been injected in the compression stroke, so that an occurrence of knocking is suppressed and the combustion performance is improved, while the retard amount of the ignition timing is being suppressed.

(5) The booster circuit 22 includes one single capacitor 22a (FIG. 2). The plurality of injectors 17a to 17d commonly use the single booster circuit 22 including the single capacitor 22a, so that the number of component parts can be reduced, the cost can be suppressed, and the configuration can be simplified.

In the above embodiment, an example has been described in which the present invention is applied to an in-vehicle gasoline engine. However, the present invention is also applicable to any internal combustion engine other than the in-vehicle internal combustion engine and any internal combustion engine other than the gasoline engine. In addition, although the specific configuration of the injector 17 has been described as an example in FIG. 1 and the like, the configuration of the injection valve that injects the fuel into the combustion chamber is not limited to such an example.

In the above embodiment, the target number of injections and the target injection timing in the adhesion reduction mode are determined in accordance with the characteristic map indicating a relationship between the engine speed and the target injection amount determined in accordance with the intake air amount that has been detected by the intake air amount sensor 34 in FIG. 5 and the like. That is, the engine output torque is detected, based on a signal from the intake air amount sensor 34. However, the injection setting unit that sets the target number of injections and the target injection timing per combustion cycle, based on an operating condition of the internal combustion engine, may be configured to use another physical amount having a correlation with the engine output torque.

In the above embodiment, an example has been described in which the temperature range determination unit 301 determines whether the engine 1 is either in the low in-cylinder temperature state or in the high in-cylinder temperature state by use of the integrated amount of the intake air amount as the workload of the engine 1. However, the temperature range determination unit that determines whether the temperature of the combustion chamber is equal to or higher than the predetermined temperature is not limited to such an example. For example, the integrated amount of the fuel injection amount may be used as the workload of the internal combustion engine. In addition, the temperature of the piston crown surface 3a is estimated as the in-cylinder temperature. However, the temperature of the cylinder wall surface or the rotor surface of the rotary engine may be estimated.

In the above embodiment, an example has been described in which the interval determination unit 303 determines whether the injection interval Δt1 from the first injection to the second injection is equal to or longer than the first recovery time Δta in step S4 of FIG. 12. In a case where a negative determination is made, the processing proceeds to step S5 to determine whether the injection interval Δt2 from the second injection to the third injection is equal to or longer than the second recovery time Δtb. However, the interval determination unit that determines whether the first interval is equal to or longer than the first threshold and determines whether the second interval is equal to or longer than the second threshold is not limited to such an example. For example, the determination as to whether the injection interval Δt1 is equal to or longer than the first recovery time Δta and the determination as to whether the injection interval Δt2 is equal to or longer than the second recovery time Δtb may be made in parallel with each other. After the determination as to whether the injection interval Δt2 is equal to or longer than the second recovery time Δtb is made, the determination as to whether the injection interval Δt1 is equal to or longer than the first recovery time Δta may be made.

The above embodiment can be combined as desired with one or more of the aforesaid modifications. The modifications can also be combined with one another.

According to the present invention, it becomes possible to suppress limitation to the number of injections of the multi-stage injection.

Above, while the present invention has been described with reference to the preferred embodiments thereof, it will be understood, by those skilled in the art, that various changes and modifications may be made thereto without departing from the scope of the appended claims.

The invention claimed is:

1. An injection control apparatus, comprising:
   an injector configured to inject fuel into a combustion chamber of an internal combustion engine;
   a drive circuit including a battery, a booster circuit configured to boost electric power from the battery, and an electric current supply circuit configured to supply drive current to the injector by using the electric power boosted by the booster circuit; and
   a controller configured to control the drive circuit, wherein
   the controller includes a processor and a memory coupled to the processor, and is configured to perform:
      setting a target number of injections and a target injection timing per a combustion cycle of the internal combustion engine based on an operating condition of the internal combustion engine;
      determining whether a first interval from a valve opening timing of a first injection to a valve opening timing of a second injection is equal to or longer than a first threshold value and whether a second interval from the valve opening timing of the second injection to a valve opening timing of a third injection is equal to or longer than a second threshold value based on the target number of injections and the target injection timing, the first injection, the second injection, and the third injection being three consecutive injections in one single combustion cycle or two consecutive combustion cycles; and
      reducing the target number of injections when it is determined that the first interval is shorter than the first threshold value and the second interval is shorter than the second threshold value.

2. The injection control apparatus according to claim 1, wherein
   the combustion chamber includes a first combustion chamber and a second combustion chamber, wherein
   the injector includes a first injector configured to inject the fuel into the first combustion chamber and a second injector configured to inject the fuel into the second combustion chamber, wherein
   the electric current supply circuit supplies the drive current to the first injector and the second injector respectively, wherein
   the controller controls the drive circuit so that the second injector injects the fuel into the second combustion chamber after the first injector injects the fuel into the first combustion chamber, wherein
   the first injection is a final injection in a combustion cycle of the first injector, wherein
   the second injection is a first injection in a combustion cycle of the second injector, wherein
   the third injection is a second injection in the combustion cycle of the second injector.

3. The injection control apparatus according to claim 2, wherein
   the first injection is an injection in a compression stroke in a combustion cycle of the first injector, wherein the second injection is a first injection in an intake stroke in a combustion cycle of the second injector.

4. The injection control apparatus according to claim 1, wherein the controller is further configured to perform:

determining whether a temperature of the combustion chamber is equal to or higher than a predetermined temperature, wherein the controller sets the target number of injections and the target injection timing so that the fuel is injected a plurality of times from an intake stroke to a compression stroke in the combustion cycle when it is determined that the temperature of the combustion chamber is lower than the predetermined temperature.

5. The injection control apparatus according to claim 1, wherein the controller is further configured to perform:

determining whether a temperature of the combustion chamber is equal to or higher than a predetermined temperature, wherein the controller sets the target number of injections and the target injection timing so that the fuel is injected once in each an intake stroke and a compression stroke in the combustion cycle when it is determined that the temperature of the combustion chamber is equal to or higher than the predetermined temperature.

6. The injection control apparatus according to claim 1, wherein the booster circuit includes one single capacitor.

7. The injection control apparatus according to claim 1, wherein the second threshold value is two times the first threshold value.

8. The injection control apparatus according to claim 1, wherein the second threshold value is calculated based on the first interval.

* * * * *